(12) United States Patent
Dunn

(10) Patent No.: US 7,840,073 B2
(45) Date of Patent: Nov. 23, 2010

(54) PICTOGRAPHIC CHARACTER SEARCH METHOD

(75) Inventor: Roger Dunn, Honolulu, HI (US)

(73) Assignee: Sunrise Group LLC, Honolulu, HI (US)

( * ) Notice: Subject to any disclaimer, the term of this patent is extended or adjusted under 35 U.S.C. 154(b) by 1082 days.

(21) Appl. No.: 11/470,624

(22) Filed: Sep. 7, 2006

(65) Prior Publication Data

US 2008/0063281 A1    Mar. 13, 2008

(51) Int. Cl.
*G06K 9/18* (2006.01)
*B41J 5/00* (2006.01)

(52) U.S. Cl. .................. 382/185; 715/262; 345/171; 400/110

(58) Field of Classification Search ........... 382/185; 400/110; 715/262, 263; 345/171; 341/28
See application file for complete search history.

(56) References Cited

U.S. PATENT DOCUMENTS

| | | | | |
|---|---|---|---|---|
| 4,144,405 A | * | 3/1979 | Wakamatsu | 178/30 |
| 4,669,901 A | * | 6/1987 | Feng | 400/484 |
| 4,670,841 A | * | 6/1987 | Kostopoulos | 715/273 |
| 5,319,552 A | * | 6/1994 | Zhong | 715/262 |
| 5,586,198 A | * | 12/1996 | Lakritz | 382/185 |
| 5,903,861 A | | 5/1999 | Chan | |
| 6,005,549 A | * | 12/1999 | Forest | 345/157 |
| 6,922,811 B1 | * | 7/2005 | Leung et al. | 715/259 |
| 2002/0193982 A1 | * | 12/2002 | Liu | 704/2 |
| 2006/0129928 A1 | * | 6/2006 | Qiu | 715/535 |

OTHER PUBLICATIONS http://www.zhongwen.com.

* cited by examiner

*Primary Examiner*—Jon Chang
(74) *Attorney, Agent, or Firm*—Rosenberg, Klein & Lee

(57) ABSTRACT

To make searching for pictographic characters, such as Chinese characters, easier for novice learners of languages using pictographic characters, a subset of pictographic character parts of the pictographic character is generated. Then, the subset of the pictographic character parts is used to generate the pictographic character based on the subset of the pictographic character parts.

13 Claims, 4 Drawing Sheets

PICTOGRAPHIC CHARACTER SEARCH METHOD

BACKGROUND OF THE INVENTION

1. Field of the Invention

The present invention relates to pictographic character generation methods, and particularly, the present invention discloses an intuitive method of generating a pictographic character based on a portion of a different pictographic character.

2. Description of the Prior Art

Many Asian languages find their roots in the Chinese language, and some incorporate Chinese characters (HanZi) or derivatives thereof in written language, some examples of which would be simplified Chinese, Japanese kanji, and Korean hanja. The earliest known Chinese characters were carved on turtle shells in approximately 6500 B.C., and, as early as 1600 B.C., a complete writing system using Chinese characters was in use in China. Today, basic literacy in Chinese requires knowledge of about 2,000 distinct characters. A person with a college degree should know anywhere from 4,000 to 5,000 distinct characters, and possibly more. With great economic gains being made in Mainland China in recent years, study of Chinese language, both written and spoken, is increasing rapidly.

Any student of Chinese should be able to identify any of a set of characters they have already learned, and also be able to find characters that they have not learned yet, but are able to identify some part of. Many Chinese character dictionaries exist to aid users of Chinese language in finding and defining Chinese characters. Some dictionaries divide Chinese characters by sound, using some phonetic system, such as PinYin or ZhuYin, to uniquely identify the characters by a sound. In PinYin, the word for "water" (Shui3) could be found by looking up the PinYin sound "Shui3," and searching for the correct character among all words that share the sound, "Shui3." Most dictionaries divide Chinese characters by parts (BuShou). To look up a character, a user goes to a part of the dictionary corresponding to a part of the character, and counts the remaining strokes in the character to find the approximate location of the character in the dictionary. Most dictionaries of this type also include a way to look up each part by a first stroke in the part.

Thus, Chinese characters and derivatives can be identified by sound, recognizable parts, and strokes. However, most students of Chinese have only a spotty vocabulary, and likewise may not be familiar with all of the sounds, parts, or strokes required to locate a character they are trying to find. Further, many recognizable parts of Chinese characters are not used in Chinese dictionaries to identify characters that contain those parts.

With the added functionality of electronic dictionaries, many input methods, which use digital input to search for Chinese characters, have come into popular use, examples of which would be Microsoft PinYin IME®, Natural ZhuYin IME, BoShiaMy, CangJie, and WuBiHua. The first two input methods are phonetic-based methods, which use PinYin and ZhuYin sounds, respectively, to identify a character. The second two methods are radical-based methods, which finds a character based on a radical component part of the character. Finally, WuBiHua is a method that maps five stroke types to the numbers 1-5 on a keypad, and finds a character based on a combination of strokes numbering no more than five strokes, typically the first four strokes in the character followed by the last stroke in the character. The phonetic and stroke methods are relatively easy to use, whereas the radical-based methods require intensive memorization for mastery. Conversely, the radical-based methods are traditionally considered faster, whereas the phonetic and stroke methods lose efficiency due to multiple characters being produced for each input combination.

Quite often, the user does not know a phonetic representation of a character, and also does not recognize any radical of the character. In this case, the WuBiHua method can be used to identify the character. However, this method is very time-consuming and not as intuitive for students. Typically, finding a character using WuBiHua requires identifying four beginning strokes of the character and one finishing stroke of the character, unless the character has fewer than six strokes. Once the correct stroke pattern is inputted, the student often must scroll through many characters to find the desired character.

On their own, all of the above methods present a special challenge to the student of Chinese, and none of them is suitable for general use in aiding students when searching for Chinese characters.

SUMMARY OF THE INVENTION

According to the present invention, a method of generating a pictographic character comprises generating a subset of the plurality of pictographic character parts of the pictographic character, and generating a pictographic character comprising the subset of the plurality of pictographic character parts according to the subset.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
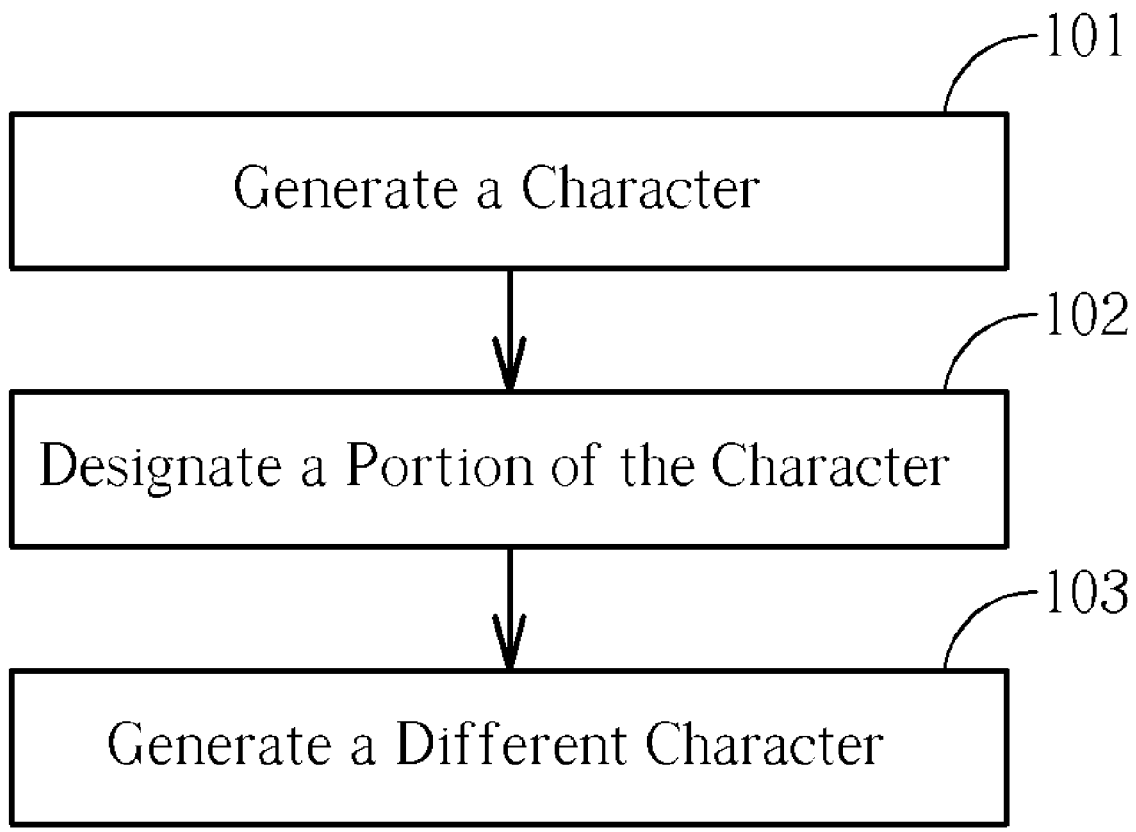
FIG. 1 is a flow chart of a method of generating a pictographic character according to the present invention.

To make searching for unknown Chinese characters easier for students of Chinese language, the present invention provides an improved method of searching for the unknown Chinese character. Please refer to FIG. 1, which is a flow chart of a preferred embodiment of the present invention method of searching for a Chinese character. The method is suitable for use in an electronic device comprising an input device, a display, and a Chinese word database. The method comprises the following steps:

Step 101: Generate a first pictographic character;

Step 102: Designate a portion of the first pictographic character; and

Step 103: Generate a different pictographic character comprising the portion of the first pictographic character.

Three possible situations can occur when generating the different pictographic character: adding a radical or non-radical portion, removing a portion, and swapping a portion.

The portion can be a radical or a non-radical portion. To illustrate the method in each of these situations, three examples are provided in the following description.

In a first example, in Step 101, the user inputs notation (deng1) to generate a pictographic character "凳". In Step 102 the user then designates a portion of the pictographic character "凳". In this case, the portion designated is the pictographic character "凳" itself. Finally, in Step 103, a portion "邑" is added to the pictographic character "凳" to form a different pictographic character "鄧". This example corresponds to the situation of adding a portion to generate the different pictographic character. As mentioned above, the portion added to generate the different pictographic character can be a radical or a non-radical portion. Adding the radical can be accomplished by inputting a keystroke sequence corresponding to the radical. Adding the radical can also be accomplished by selecting the radical from a list of radicals. Likewise, adding the non-radical portion can be accomplished by inputting a keystroke sequence corresponding to the non-radical portion. Adding the non-radical portion can also be accomplished by selecting the non-radical portion from a list of non-radical portions.

In a second example, in Step 101, the user inputs notation (gei3) to generate a pictographic character "給". In Step 102, the user designates a portion "合" of the pictographic character "給". In Step 103, a different pictographic character "合", which is the portion "合" itself, is generated. This example corresponds to the situation of removing a portion to generate the different pictographic character.

Finally, in Step 101, the user inputs notation (shao1) to generate a pictographic character "燒". In Step 102, the user designates a portion "尭" of the pictographic character "燒". In Step 103, the user adds a radical "糸" to the portion to generate a different pictographic character "繞". This example corresponds to the situation of swapping a portion to generate the different pictographic character.

Of course, in the above examples, Pinyin notation is used to generate the pictographic character. It would be obvious to anyone of basic skill in the art that use of any input method that is capable of generating the pictographic character would work in the present invention method described above. Further, it would also be obvious to anyone of basic skill in the art that many types of input devices could be used to input the notation to generate the pictographic character, and many types of input devices could be used to designate the portion of the pictographic character. Finally, adding the radical or non-radical portion to the portion could be accomplished through a number of means, including inputting a keystroke sequence corresponding to the radical or the non-radical portion, and using an input device to graphically select the radical or the non-radical portion from a plurality of radicals or non-radical portions, respectively. Designating the portion of the first pictographic character can be accomplished by splitting the first pictographic character into a plurality of portions and selecting the portion from the plurality of portions. Selecting the portion from the plurality of portions could comprise clicking on the portion. Selecting the portion from the plurality of portions could also comprise scrolling through the plurality of portions and pushing a button to select the portion.

It should also be noted that, although the present invention method is preferably used to generate Traditional Chinese pictographic characters, the present invention method is easily applicable to any pictographical language. In other words, the present invention method could easily be extended to application to Simplified Chinese, Kanji and Hanja and derivatives thereof.

The present invention also teaches a method of generating a pictographic character comprising a plurality of pictographic character parts. Please refer to FIG. 2 for a flow chart of a second embodiment of the present invention method. The second embodiment method comprises the following steps:

Step 201: Enter an input corresponding to a subset of the plurality of pictographic character parts of the pictographic character; and Step 202: Generate a plurality of pictographic characters comprising the subset of the plurality of pictographic character parts.

The second embodiment of the present invention method is illustrated in the following example. Taking again the pictographic character "繞" (rao4) mentioned above, in the second embodiment of the present invention method, the pictographic character "繞" comprises a plurality of pictographic character parts "糸" (mi4) and "尭" (yao2). The user would enter an input "mi4yao2", which corresponds to a subset of the plurality of pictographic character parts "尭" (yao2) and "糸" (mi4). Then, the electronic device would generate a plurality of pictographic characters in which each pictographic character of the plurality of pictographic characters comprises the subset of the plurality of pictographic character parts "尭" (yao2) and "糸" (mi4). It is worth mentioning that an order of the input "mi4yao2" is not critical for the present invention method. The user could just as easily enter an input "yao2 mi4" corresponding to the subset of the plurality of pictographic character parts "尭" (yao2) and "糸" (mi4). In other words, the present invention method would generate an equivalent plurality of pictographic characters comprising the subset of the plurality of pictographic character parts "尭" (yao2) and "糸" (mi4) regardless of the order of the input. Further, the plurality of pictographic character parts "糸" (mi4) and "尭" (yao2) of the present invention method is not limited to two pictographic character parts "糸" (mi4) and "尭" (yao2). Instead, a plurality of pictographic character parts "糸" (mi4), "土" (tu3), and "兀" (wu4). In this case, an input "mi4wu4" corresponding to a subset "糸" (mi4) and "兀" (wu4) of the plurality of pictographic character parts "糸" (mi4), "土" (tu3), and "兀" (wu4) could be entered. The generated plurality of pictographic characters may be a plurality of one if only one result is available and/or be limited by design considerations of the electronic device.

In the above method, entering the input corresponding to the subset of the plurality of pictographic character parts of the pictographic character could be accomplished by entering a Pinyin string corresponding to the subset of the plurality of pictographic character parts of the pictographic character. Entering the input corresponding to the subset of the plurality of pictographic character parts of the pictographic character could also be accomplished by entering a Zhuyin string corresponding to the subset of the plurality of pictographic character parts of the pictographic character. Entering the input corresponding to the subset of the plurality of pictographic character parts of the pictographic character could further be accomplished by selecting the subset of the plurality of pictographic character parts of the pictographic character from a list of pictographic character parts. Finally, entering the input corresponding to the subset of the plurality of pictographic character parts of the pictographic character could be accomplished by selecting the subset of the plurality of pictographic character parts of the pictographic character from a table of pictographic character parts.

Figure 3:
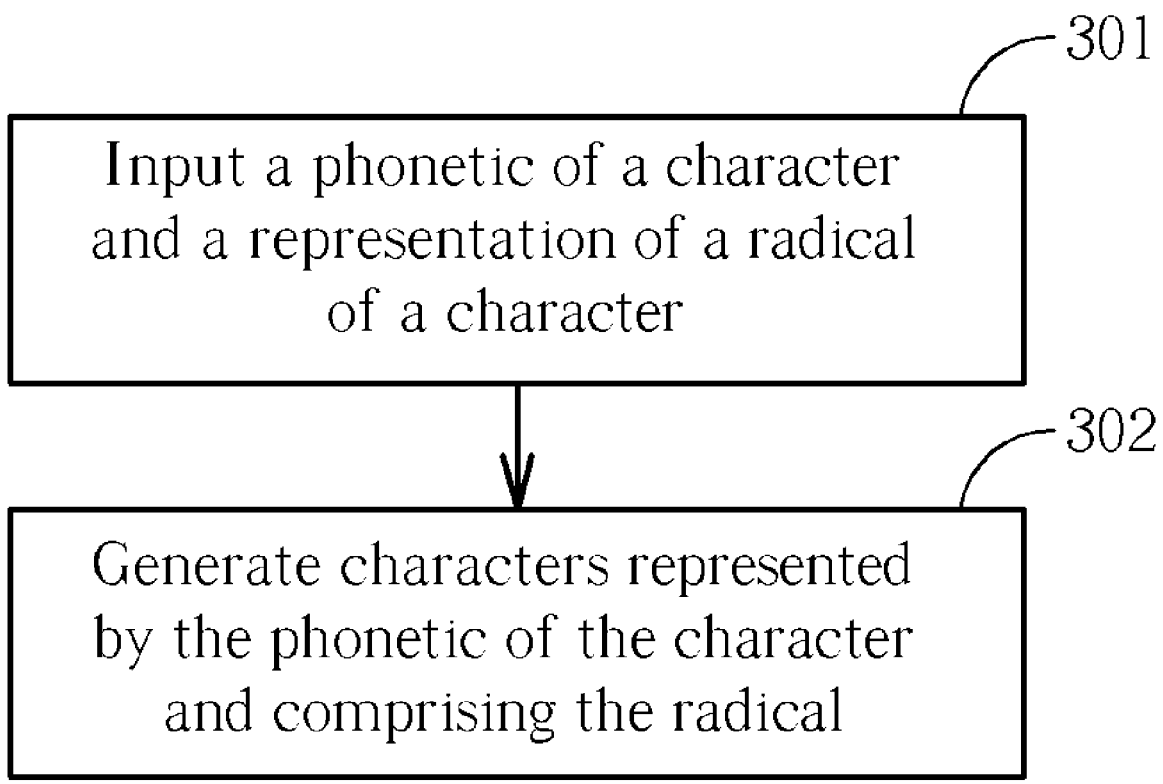
FIG. 3 is a flow chart of a third method of generating a pictographic character according to the present invention.

The present invention also teaches a third method of generating a pictographic character. The third method of generating a pictographic character according to the present invention is shown in FIG. 3. The third method of generating a pictographic character according to the present invention comprises the following steps:

Step 301: Enter an input comprising a phonetic representation of the pictographic character and a predetermined representation of a radical of the pictographic character; and Step 302: Generate a plurality of pictographic characters that are represented by the phonetic representation of the pictographic character and comprise a radical represented by the predetermined representation of the radical of the pictographic character.

Using a Pinyin input system for an example, a pictographic character "鄧" (deng4) would be represented by an input "deng4y." The input "deng4y" comprises a phonetic Pinyin representation "deng4" of the pictographic character "鄧" and a predetermined representation "y" of a radical "邑" of the pictographic character. In this case, the predetermined representation "y" is a first letter of a Pinyin representation "yi4" of the radical "邑" of the pictographic character "鄧". The predetermined representation of a radical may be phonetically based, but many other methods are equally applicable. Based on the input "deng4y", the method then generates a plurality of pictographic characters that are represented phonetically by the phonetic representation "deng4" and comprise a radical represented by the predetermined representation "y". Of course, this method could be extended for use in any phonetic representation system, such as Zhuyin or Romaji. For example, in a Zhuyin system, the step of entering the input comprising the phonetic representation of the pictographic character and the predetermined representation of the radical of the pictographic character could be accomplished by entering an input comprising a Zhuyin representation of the pictographic character and a first symbol of a Zhuyin representation of the radical of the pictographic character. The generated plurality of pictographic characters may be a plurality of one if only one result is available and/or be limited by design considerations of the electronic device.

Figure 2:
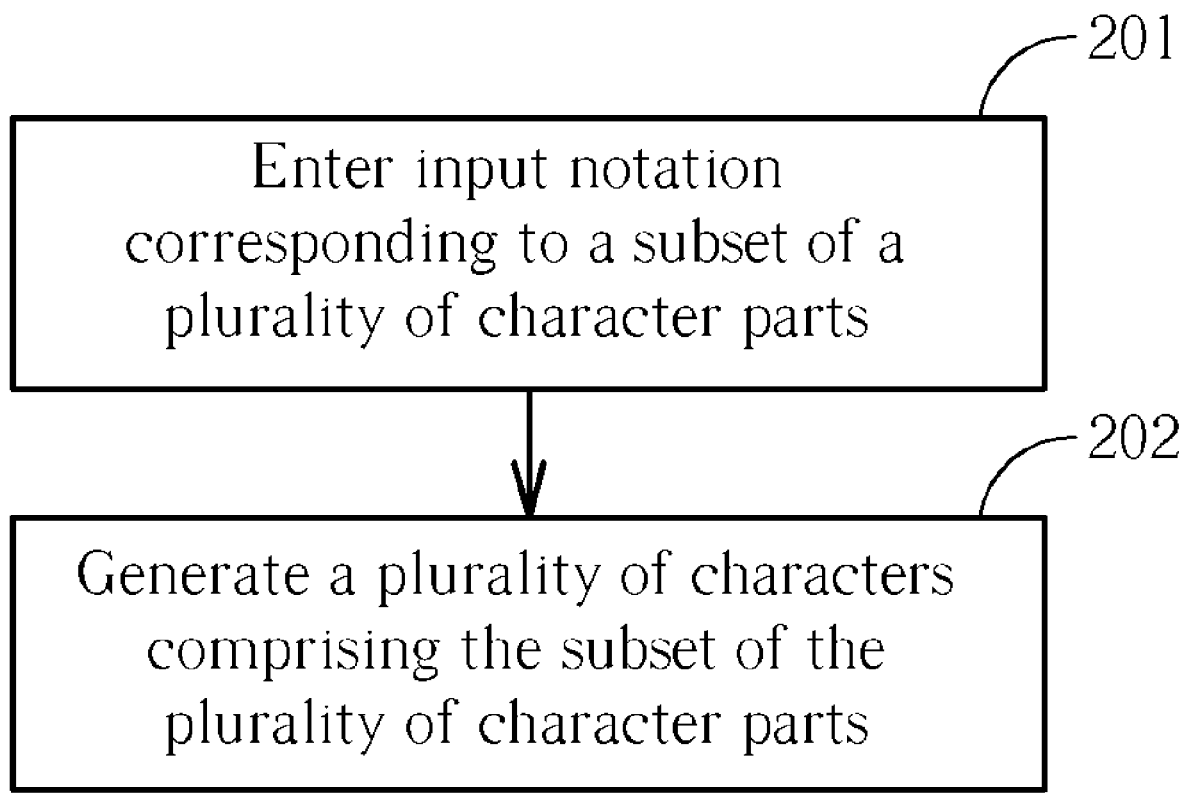
FIG. 2 is a flow chart of a method of generating a pictographic character comprising a plurality of character parts according to the present invention.

Of course, Step 301 above could be integrated into the method shown in FIG. 2. Particularly, a user could input a string such as "yao2#mi4" to generate the character "繞" (rao4). In this example, the predetermined representation "#mi4" of the radical of the pictographic character is used, wherein the predetermined representation comprises a pound # and a pinyin representation of the radical. Of course, other predetermined representations could be used to generate the character "繞". The predetermined representation could comprise a dollar $ and the pinyin representation of the radical. In either of the two examples above, the predetermined representation could comprise a ZhuYin representation of the radical instead of the pinyin representation of the radical. The predetermined representation could also comprise a Japanese representation, a Korean representation, an English phonetic representation, a Chinese dialectal representation, or any other phonetic (sound) representation. The Japanese representation could be Romaji, Katakana, or Hiragana representation. The Korean representation could be a Hangul, Hanja, or KSC representation. Any phonetic representation of the pictographic character or the radical or non-radical portions of the pictographic character can be used in the present invention method.

In the present invention method, a character could first be generated by using the method shown in FIG. 2. Then, the method of FIG. 1 could be used to generate a different character based on a portion of the character generated by using the method shown in FIG. 2. In this embodiment, the method would comprise steps of generating a subset of the plurality of pictographic character parts of the pictographic character, generating a pictographic character comprising the subset of the plurality of pictographic character parts according to the subset, designating a portion of the pictographic character, and generating a different pictographic character comprising the portion of the pictographic character. Generating the different pictographic character comprising the portion of the pictographic character could be accomplished by adding a radical to the portion of the pictographic character, or by adding a non-radical character part to the portion of the pictographic character.

It should be noted that, for use in an electronic device, all radicals and a subset of all non-radical portions found in pictographic characters, such as Traditional Chinese characters, are assigned unique identifiers to enable mapping from keystrokes or selections that constitute input from a user of the electronic device. The unique identifiers, as well as the subset of non-radical portions, can be adapted based on design considerations.

The present invention method also allows the user to "customize" how the pictographic characters are broken down. There may be 1 to 3 ways to break down a character. The user may break a character down by radical+parent, or by radical+2 or more components. The user may also break down a character by non-character component+character component, or by non-character component+non-character component. This is decided by the user, and any method of breaking down the character is acceptable. After the user breaks down the character in any of the above described methods, they can "relate" character parts to corresponding keys on the keyboard, as they see fit. For example, a character "日" (sun) could be related to a key "r" because a Pinyin representation for the character "日" is "ri4," or the character "日" could be related to the key "s" corresponding to a first initial of the English word "sun," or the character "日" could be related to a key "B" because a shape of the character "日" looks like the letter "B."

Figure 4:
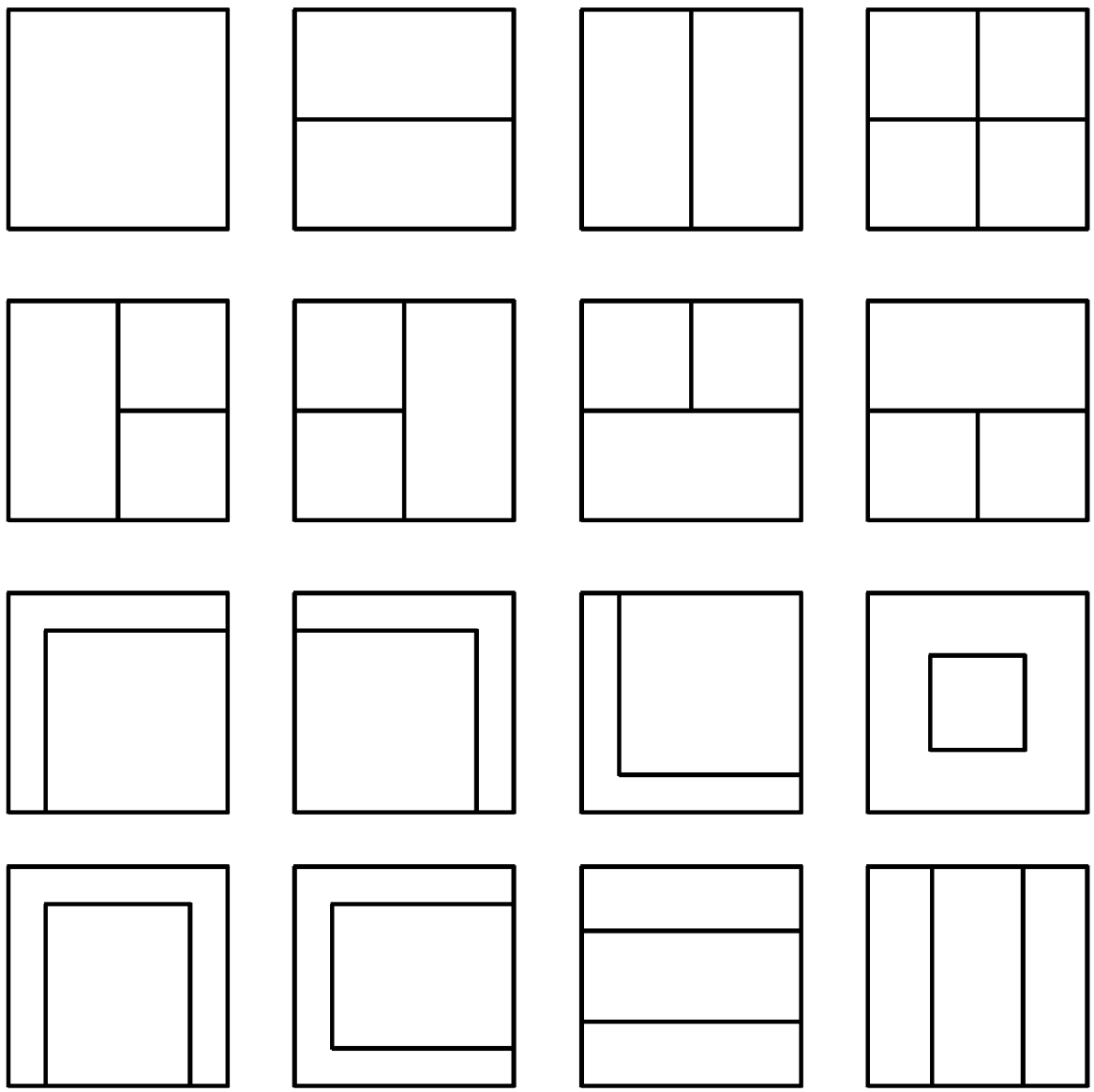
FIG. 4 is a diagram of different ways to break down a different pictographic character by locations of a character part.

When generating the different pictographic character comprising the portion of the pictographic character, a location of the character part in the different character can be selected to generate the different pictographic character. Please refer to FIG. 4, which is a diagram of different ways to break down the different pictographic character by locations of the character part. Each location corresponds to a part of the character. FIG. 4 shows 16 different character configurations that could be used to break down the different pictographic character into corresponding character part locations. Each character part location could be mapped to a key or a button of an electronic device. For example, on a keypad of a mobile phone, a character with four parts (as shown in the top-right corner of FIG. 4), could have each character part mapped to a corresponding number key of the keypad. A top-left part of the character could be mapped to a top-left number key "1" of the keypad, a top-right part of the character could be mapped to a top-right number key "3" of the keypad, a bottom-left part of the character could be mapped to a bottom-left number key "7" of the keypad, and a bottom-right part of the character could be mapped to a bottom-right number key "9" of the keypad. For a character with three parts (as shown in the bottom-right corner of FIG. 4), each character part could be mapped to a corresponding number key or to a plurality of corresponding number keys of the keypad. For example, a left part of the character could be mapped to any of a plurality of left-side keys "1", "4", "7", "*" of the keypad, a middle part of the character could be mapped to any of a plurality of middle keys "2", "5", "8", "0" of the keypad, and a right part of the character could be mapped to any of a plurality of right-side keys "3", "6", "9", "#". Using the same method just described, any of the character configurations shown in FIG. 4 could be mapped to the keypad, or even to a traditional keyboard. Though the present invention provides default mappings, the mappings could also be user defined.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating a pictographic character on a display of an electronic device comprising an input device, the method comprising:

the electronic device generating on the display a pictographic character comprising a radical portion and at least one non-radical portion;

designating at least one of the at least one non-radical portions as a selected portion; and the electronic device generating on the display a different pictographic character comprising the selected portion.

2. The method of claim 1, wherein generating the different pictographic character comprising the selected portion comprises adding a radical to the selected portion of the pictographic character.

3. The method of claim 1, wherein generating the different pictographic character comprising the selected portion comprises adding a non-radical portion to the selected portion.

4. The method of claim 3, wherein adding a non-radical portion to the selected portion comprises selecting the non-radical portion from a list of non-radical portions.

5. The method of claim 1, wherein generating the different pictographic character comprising the selected portion of the pictographic character comprises selecting a location of the character part in the different character.

6. The method of claim 1, wherein designating at least one of the at least one non-radical portions as the selected portion comprises using the input device to enter a string corresponding to a meaning of one of the pictographic character portions.

7. The method of claim 1, wherein designating at least one of the at least one non-radical portions as the selected portion comprises using the input device to enter a string corresponding to a shape of one of the pictographic character portions.

8. The method of claim 1, wherein designating at least one of the at least one non-radical portions as the selected portion comprises selecting the selected portion from a list of pictographic character parts.

9. The method of claim 1, wherein designating at least one of the at least one non-radical portions as the selected portion comprises selecting the selected portion from a table of pictographic character parts.

10. The method of claim 1, wherein the electronic device generating on the display the pictographic character comprises using the input device to enter a phonetic representation of the pictographic character and a predetermined representation of a radical or a non-radical portion of the pictographic character.

11. The method of claim 1, further comprising when generating the different pictographic character comprising the selected portion, generating the different pictographic character where the selected portion occurs in a selectable location of the generated different pictographic character selected by a user of the electronic device.

12. The method of claim 11, further comprising mapping each selectable location in the different pictographic character to corresponding keys of the input device.

13. The method of claim 11, further comprising mapping each location in the pictographic character to corresponding keys of the input device.

* * * * *